Patented Feb. 2, 1932                                                          1,843,719

UNITED STATES PATENT OFFICE

PHILIP H. GROGGINS, OF WASHINGTON, DISTRICT OF COLUMBIA; DEDICATED TO THE PEOPLE AND THE GOVERNMENT OF THE UNITED STATES OF AMERICA

PROCESS OF PREPARING 2-HYDROXY-PARA-PHENYL-ORTHO-BENZOYL-BENZOIC ACID

No Drawing.       Application filed August 8, 1929.   Serial No. 384,509.

(GRANTED UNDER THE ACT OF MARCH 3, 1883, AS AMENDED APRIL 30, 1928; 370 O. G. 757)

This application is made under the act approved April 30, 1928, and the invention herein described may be manufactured and used by or for the Government for governmental purposes without payment to me of any royalty thereon.

I have discovered that 2-hydroxy-para-phenyl-ortho-benzoyl-benzoic acid may be prepared by treating the 2-halogen-para-phenyl-ortho-benzoyl-benzoic acid, or its salts in a water or alcoholic solution with alkaline reacting substances. The reaction proceeds at a reasonable rate at elevated temperatures, the velocity of reaction increasing in proportion to the temperature. In carrying out the reaction, any suitable alkaline reacting substance may be used, such as caustic soda or potash, sodium or potassium carbonate or the like, all of these alkaline substances giving the same end product.

The general reaction may be expressed by the following graphic formula in which M represents a metallic radicle and hlg represents a halogen atom:

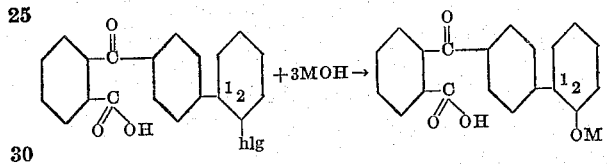

The product obtained is 2-hydroxy-para-phenyl-ortho-benzoyl-benzoic acid, having a melting point of 185°–186° C. after recrystallizing the crude product from glacial acetic acid.

Without limiting my invention to any particular procedure, the following example in which parts by weight are given illustrates the application of my invention in the preferred form: A mixture of 33.6 parts of 2-chloro-para-phenyl-ortho-benzoyl-benzoic acid, 15 parts sodium hydroxide in the form of a 20 per cent solution with 60 parts of water is heated in an agitated pressure vessel at 150°–220° C. for a period of 12 hours. The pressure is maintained between 100 and 250 pounds per square inch. At the end of this period, the reaction mass which is a clear dark yellow to light brown solution is diluted, filtered and cooled to room temperature. The filtrate is then added to 1000 parts of iced 3 per cent sulfuric acid. The precipitated crude product which has a slight gray color is filtered and washed free of acid with boiling water. The yield of dried product is 30.8 parts corresponding to 96.9 per cent of theory with a melting point of 183°–184° C. After making a dilute ammonium salt solution and reprecipitating with dilute sulfuric acid the melting point is 185° C.

It is obvious that instead of starting with 2-chloro-para-phenyl-ortho-benzoyl-benzoic acid any other para-halogen derivatives may be employed.

I am aware that numerous details of the process may be varied through a wide range without departing from the spirit of this invention and I do not desire limiting the patent granted hereon otherwise than as necessitated by the prior art.

It is readily appreciated that when the operating temperature is above 200° C., that a shorter reaction period is required than when 150° C. is used. A temperature in excess of 220° C. gives rise to dark reaction products, while a temperature below 150° C. unnecessarily prolongs the reaction time. The pressure in the reaction vessel will of course correspond to the temperature of reaction.

I claim as my invention:—

1. The process of preparing 2-hydroxy-para-phenyl-ortho-benzoyl-benzoic acid, which comprises heating 2-halogen-para-phenyl-ortho-benzoyl-benzoic acid with an alkaline reacting substance whereby the halogen is split off and replaced by an hydroxyl group accompanied by the formation of an alkali metal halide.

2. The process of preparing 2-hydroxy-para-phenyl-ortho-benzoyl-benzoic acid which comprises heating 2-chloro-para-phenyl-ortho-benzoyl-benzoic acid with an alkaline reacting substance whereby the chlorine atom is replaced by an hydroxyl group accompanied by the formation of an alkali metal chloride.

3. The process of preparing 2-hydroxy-para-phenyl-ortho-benzoyl-benzoic acid which comprises heating 2-chloro-para-phenyl-ortho-benzoyl-benzoic acid with a solution of caustic alkali to a temperature of between 150–220° C. at a pressure of 100–250 pounds per square inch, whereby the chlorine atom is split off to form alkali metal chloride and replaced by an hydroxyl group.

4. The process of preparing 2-hydroxy-para-phenyl-ortho-benzoyl-benzoic acid which comprises heating approximately 1 molecular proportion of 2-chloro-para-phenyl-ortho-benzoyl-benzoic acid with a slight excess over three molecular proportions of caustic alkali in the form of its water solution at a temperature of between 150–220° C. and at a pressure of 100 to 250 pounds per square inch for a prolonged period of time, cooling and precipitating out the product.

5. As a new article of manufacture 2-hydroxy-para-phenyl-ortho-benzoyl-benzoic acid having the following formula:

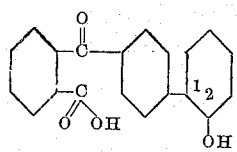

In testimony whereof I have hereunto subscribed.

PHILIP H. GROGGINS.